United States Patent [19]

Landsman

[11] Patent Number: 4,792,858
[45] Date of Patent: Dec. 20, 1988

[54] OPTICAL SCANNING SYSTEM HAVING A ROTATABLE PLATEN ASSEMBLY AND METHOD FOR LOADING SAME

[75] Inventor: Robert M. Landsman, Huntington Station, N.Y.

[73] Assignee: Powers Chemco, Inc., Glen Cove, N.Y.

[21] Appl. No.: 58,807

[22] Filed: Jun. 5, 1987

[51] Int. Cl.⁴ .................... H04N 1/10; H04N 1/04
[52] U.S. Cl. .................................. 358/293; 358/285
[58] Field of Search ............... 358/285, 287, 289, 290, 358/291, 292, 293, 294

[56] References Cited

U.S. PATENT DOCUMENTS

| | | | |
|---|---|---|---|
| 3,155,383 | 11/1964 | Whitmore | 269/58 |
| 3,662,103 | 5/1972 | Willmer et al. | 358/285 |
| 3,867,675 | 2/1975 | Kitz et al. | 358/293 |
| 3,886,371 | 5/1975 | Lloyd | 358/285 |
| 3,938,191 | 2/1976 | Jarmy | 358/289 |
| 4,131,916 | 12/1978 | Landsman | 358/285 |
| 4,245,259 | 1/1981 | Pick | 358/285 |
| 4,319,283 | 3/1982 | Ozawa et al. | 358/293 |
| 4,348,697 | 9/1982 | Takahashi et al. | 358/293 |
| 4,417,260 | 11/1983 | Kawai et al. | 346/160 |
| 4,455,910 | 6/1984 | Kraft et al. | 83/874 |
| 4,471,375 | 9/1984 | Oritsuki et al. | 358/285 |
| 4,476,496 | 10/1984 | Thaler | 358/293 |
| 4,485,409 | 11/1984 | Schumacher | 358/294 |
| 4,495,871 | 1/1985 | Nagata et al. | 108/20 |
| 4,686,581 | 8/1987 | Spehrley, Jr. et al. | 358/293 |

FOREIGN PATENT DOCUMENTS 57-112181 7/1982 Japan.
58-54775 3/1983 Japan .................................. 358/293

Primary Examiner—James J. Groody
Assistant Examiner—Randall S. Svihla
Attorney, Agent, or Firm—Morgan & Finnegan

[57] ABSTRACT

An optical scanning system for (i) scanning images from film transparencies or reflective copy, and for (ii) reproducing images onto film or photosensitive paper to prepare films, printing plates and the like. A paten assembly having two platens, each platen having an image area, is rotatable between positions to selectively locate one of the platens in an orientation for scanning an image area of such platen. A scanner traces scan lines across the image area in a first direction as a gantry assembly transports the scanner over the image area in a second direction. When scanning an image (as opposed to scanning to reproduce an image), photodetectors detect light either transmitted through a film containing an image or reflected from a reflective copy containing an image. The photodetector is sampled by a system computer. When scanning to reproduce an image, a film is loaded onto a platen and the scanner scans in raster fashion over the film. A light source on the scanner is modulated during the scanning to reproduce an image onto the film. To load the film the scanner is automatically moved out of the platen's path of rotation, a sheet of film is automatically raised to the platen which by vacuum force holds the film to the platen, and the platen is rotated to bring the film into a position to be scanned.

15 Claims, 8 Drawing Sheets

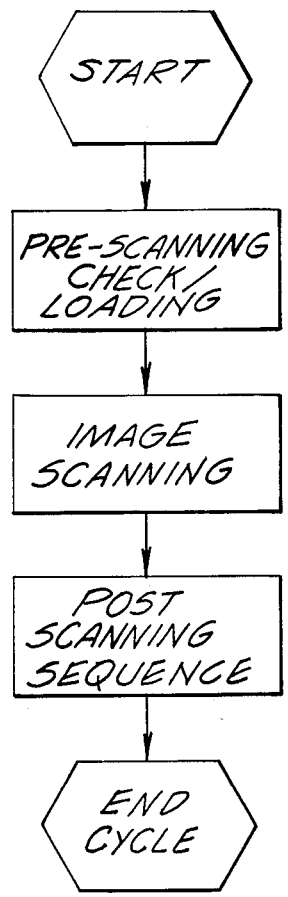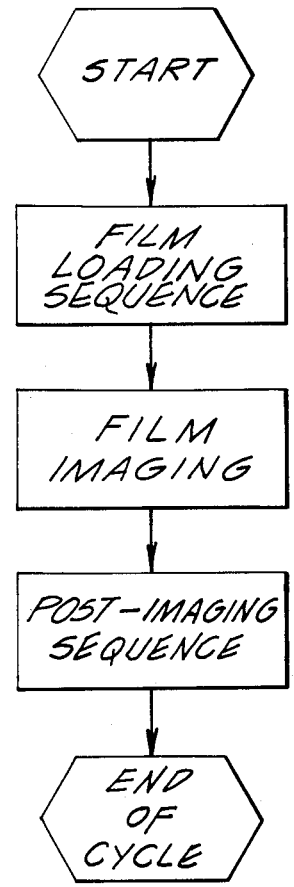
FIG. 9 — STATE SEQUENCE FOR SCANNING
FIG. 10 — STATE SEQUENCE FOR IMAGING

OPTICAL SCANNING SYSTEM HAVING A ROTATABLE PLATEN ASSEMBLY AND METHOD FOR LOADING SAME

FIELD OF INVENTION

This invention relates to an optical scanning system of high resolution and accuracy useful in preparing or reproducing images on or from films, printing plates and the like for such industries as newspapers, publishing, and engineering. In particular, the invention relates to an improved optical scanning system of the type which traces a raster over a stationary image area and which is capable of reading images from transparent or reflective copies and scanning images onto film or other photosensitive material.

BACKGROUND

Scanners for facsimile reproduction optically scan an original image to develop electronic signals representative of the image. These signals can be processed, stored, combined with computer generated data, transmitted to other locations and/or utilized in reproduction apparatus to redevelop the image.

Electronic signal representations of images have been transmitted using facsimile equipment in the newspaper industry since as early as the 1940's. Newspapers, such as the Wall Street Journal, pioneered the use of facsimile techniques. Facsimile equipment requires scanners for reading the image and recorders for recording the image. Facsimile technology is used, for example, to prepare negatives from which printing plates are made to print reproductions of optically scanned sheets such as a paste-up of a newspaper page.

When facsimile equipment was first developed for transmitting a scanned image to remote sites, the transmitting site required an operator to load each original page onto the scanner, while the receiving site required an operator to load each sheet of film onto a drum recorder. Transmission at the time was over narrow bandwidth Phone lines. Problems with the facsimile equipment included slow operation and transmission times and inaccuracy of the images upon the film. Because of the labor intensive nature of the equipment and the long transmission times of several minutes for each page, facsimile methods could be tolerated only by newspapers having a national distribution.

For facsimile equipment to be feasible for large metropolitan newspapers, increased speed and improved productivity was required. To improve throughput, wide bandwidth communications were adopted, reducing per-page transmission time to approximately one minute. Line of sight microwave transmissions and then satellite transmissions have reduced the per-page transmission time to approximately 45 seconds. The additional time for loading and unloading between each page of transmission, however, still caused the total time per page to be several minutes. An initial solution was to use redundant equipment in a ping-pong fashion, such that one set of equipment would be loaded while the second set was transmitting or receiving.

One solution in the prior art to decrease loading and unloading time was to replace the facsimile drum recorders with flatbed recorders having on-line film processors and automated feed mechanisms. Dow Jones developed such a device in approximately 1975. The on-line film processor of that system operated with a laser source which recreated the image on a film by modulating a scanner laser beam on and off to expose portions of the film, one scan line at a time. Automated feed mechanisms enabled the receiving equipment to be less labor intensive than in prior systems.

The use of a laser beam for recording and reading enables precise imaging of film. Vibrations of the system, however, can be transmitted to the laser and produce a displaced image at the position scanned by the laser during vibration. The Dow Jones news scanning device referred to above includes a flat optical table mounted to a base with an air suspension system for isolating the optical table from external vibrations. A movable platen resides on the optical table for holding unexposed film that will be imaged or for holding an original that will be scanned. A laser beam scans the film or original along one orthogonal direction, e.g., transversely, while the platen travels continuously at a constant velocity along a second orthogonal direction, e.g., longitudinally. Scanning is effected by deflecting the beam in the scanning direction. As the platen moves, the laser beam scans consecutive lines of, for example, a newspaper page onto the film from left to right across the page in raster fashion.

Because the platen moves under the laser during scanning or imaging, the Dow Jones device must be at least twice the length of the platen. As a result, the device must be of sufficient mass and stability to minimize vibration and maintain accuracy over the entire path of the platen.

Accuracy is an important factor for systems used in the newspaper industry. Newspapers typically require a higher degree of resolution with larger formatted pages and faster throughput than facsimile transmission machines of, for example, inter-office use. Machines capable of achieving higher resolution typically are either too slow or too labor consuming for most newspapers. Additionally, many newspapers now use color formats on some pages. Such color formats require scanners which provide greater resolution and positional accuracy than those intended primarily for black and white reproduction.

One approach for achieving accuracy is to increase the size and mass of the components, thereby achieving better immunity from vibration and better stability. However, the moving parts in these high mass scanners inherently have been burdened with high mechanical accelerations and forces. The momentum attributable to large rapidly moving components in prior art scanners, however, can develop undesirable internal vibrations with a resultant decrease in accuracy.

One object of this invention is to provide an optical scanning system enabling easy loading and unloading techniques to reduce the total per page time to one minute or less. To accomplish this a platen or platens are rotatable between a position for scanning and a position for loading.

Another object of this invention is to provide a scanning system in which the scanner moves over an image area to trace mutually displaced scan lines. This reduces the burdens of the high mechanical accelerations and forces of the massive moving components in the prior art.

It is another object of this invention to provide a scanning system employing a housing having good damping characteristics to substantially isolate the scanner and image area from external vibrations.

In the past images on transparent material have been scanned by placing reflective paper behind the transparency and sensing the reflected beam. A problem with such method is that the reflected beam interferes with the scanning beam causing some inaccuracy. As the precision needs increase this noise in the signals representing the images becomes more significant.

It is therefore an additional object of this invention to provide an optical scanning system capable of scanning images on either transparent or reflective materials.

It is another object of this invention to provide an optical scanning and imaging system having the requisite geometric accuracy resolution, format, and speed for present day electronic imaging and at a cost which is affordable for commercial printing, newspaper, engineering and business applications.

Additional objects of the invention are to provide a scanning device which employs a scanner of reduced size with no loss in scanning accuracy and a scanning beam detector which moves with the scanner.

The present invention encompasses facsimile scanning systems capable of operating either as a scanner for developing electrical signals representing the image which has been scanned, or as a recorder which can reproduce images using a coherent beam that is modulated by the electrical signals to expose a photographic sheet of film.

SUMMARY OF THE INVENTION

Briefly, the foregoing objects are attained in the present invention by improvements including reduced internal and external vibrations to minimize transient positional inaccuracy, a moving scanner enabling reduced overall size and space requirements, a rotatable dual platen assembly for providing a capability of either transmission or reflective scanning modes and a capability of employing rapid loading/unloading techniques, and a scanning mechanism wherein the scanning beam detector moves with the scanner.

In the preferred embodiment described herein, the scanning apparatus is mounted on a gantry assembly which moves at a constant speed longitudinally along rails of a level base and over a scanning area. Simultaneously, the moving scanning apparatus traces out repetitive scans in a lateral direction across the scanning area. For imaging a film, for example, the scanner includes a laser source modulated by a time sequence of electric signals for reproducing an image on the film.

For scanning an original image in the preferred embodiment, the scanning beam energy either reflected from the original or transmitted through the original is detected by a scanning beam detector, whose output which is sampled by a system computer, the sampled output being stored as a time sequence of electrical signals which represent the image. Such signals often are collectively referred to as the raster image.

The original sheet of film to be scanned is positioned on a platen over which the gantry moves. In accordance with the invention, the platen is part of a dual platen assembly. One platen is transparent to the scanning beam so that a transparency can be scanned and the scanning beam sensed without the noise interference from a reflected beam. A scanning beam detector is supported for longitudinal movement with the scanner in the space between the two platens. Similarly, another scanning beam detector is positioned above the dual platen assembly. It, too, moves with the scanner in the longitudinal direction during scanning.

Because of the dual platens, the system is capable of recording an optical image on either a reflective or transparent background. A newspaper paste-up typically has a reflective background. For scanning images on a paste-up, either platen may be the top platen. In this mode, the photodetector positioned above the dual platen assembly and moving with the gantry, in the manner noted above, detects the beam reflected from the reflective copy. For scanning images on a transparency, the transparent platen is rotatable to the top platen. Since in this case the scanning beam detector is positioned between the two platens and underneath the transparent plane of the top platen, the scanning beam transmitted through the transparency can be detected.

For imaging (recording) a film, either platen may be in the top position, although in the preferred embodiment the metal vacuum platen is the top platen.

To accomplish rapid loading between imaging successive sheets of film, the elements are designed to permit the gantry assembly to clear the end of the dual platen assembly. This enables the dual platen assembly to rotate without interference from the scanner and gantry.

Other features incorporated on the preferred embodiment include a loading/unloading device wherein a vacuum bar movable with the gantry removes the sheet material from the platen. In addition, an automatic storage platen carrying the next sheet of film and located below the dual platen assembly can be raised to bring the sheet to the vacuum platen, which then holds the film using a vacuum force. Upon lowering the storage platen, the dual platens can be rotated to place the sheet on top in preparation for to the next scanning operation. While scanning is taking place, the automatic storage platen is reloaded.

To achieve accurate scanning, the gantry assembly preferably is supported for movement along rails or the like on air bearings. The rails are maintained level using an air suspension system which achieves a degree of vibration isolation. Further isolation from external vibrations is accomplished by the use of special housing materials having good vibrational damping characteristics.

For a more complete understanding of the invention, reference should be made to the following detailed description of the preferred embodiment, in conjunction with the drawings, in which:

BRIEF DESCRIPTION OF THE DRAWINGS

FIG. 9 is a flow chart of the operational sequence for scanning an image;

FIG. 10 is a flow chart of the operational sequence for imaging a sheet of film;

DETAILED DESCRIPTION OF A PREFERRED EMBODIMENT OF THE INVENTION

Figure 1:
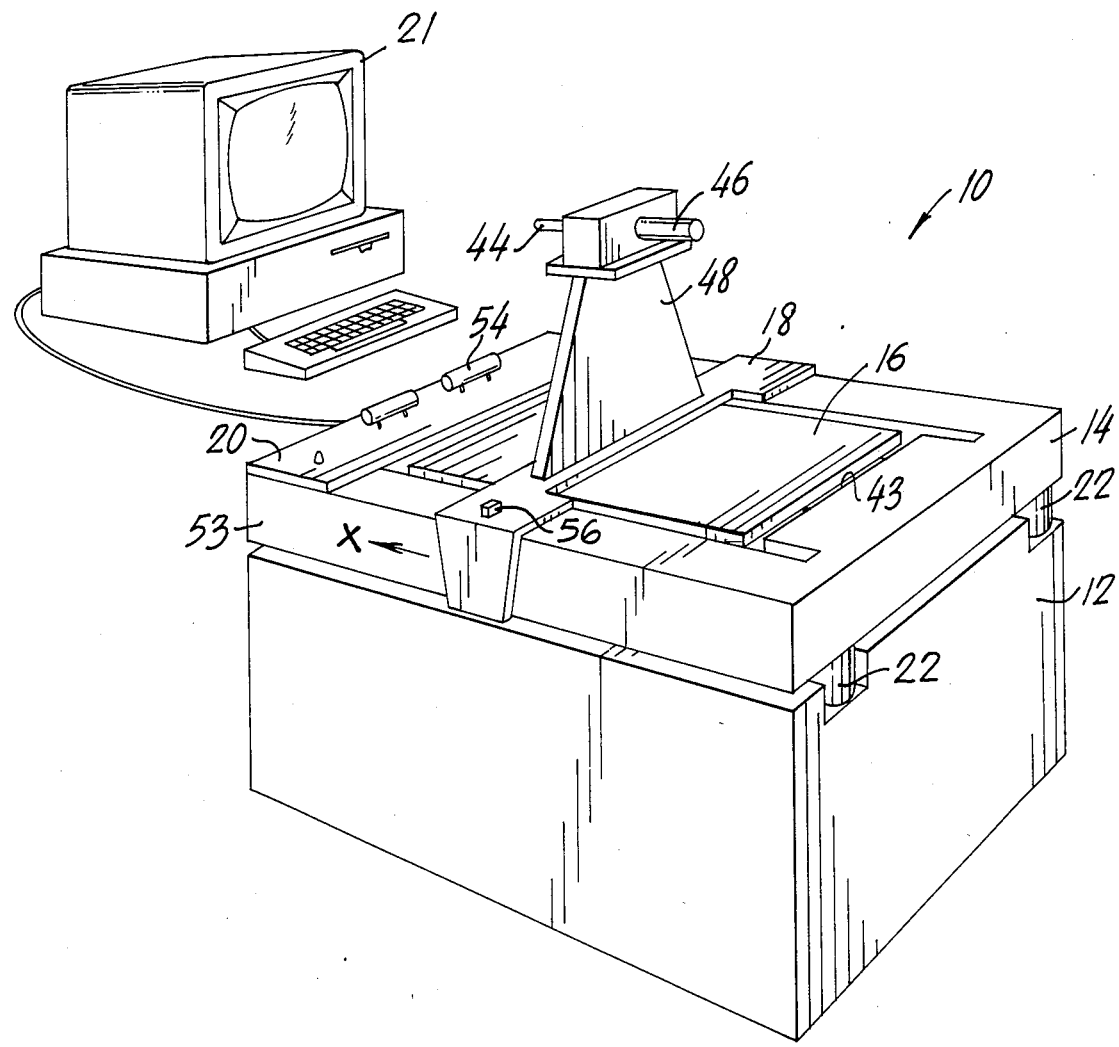
FIG. 1 is a perspective view of the preferred embodiment of the optical scanning system.

Referring to FIG. 1, an optical scanning system for transmitting and receiving electronic images embodying the features of this invention is indicated by the numeral 10. The system 10 includes a housing 12, a level base 14, a dual platen assembly 16, a gantry assembly 18, an interferometer assembly 20, and a system computer 21. Preferably, the housing 12 is made of a substance which has superior vibrational damping characteristics. One such substance is "Granitan", a stone and epoxy combination developed by the Fritz Studer AG Company in Switzerland. The "Granitan" has good damping characteristics and a smooth outer surface. It also is low in cost and easily formed into shapes. While the housing 12, may be made from and include other materials, it is desirable that it have a capacity for attenuating vibrations transmitted to it by external or internal forces.

The physical properties of Granitan are listed below:
Damping Factor—5.5 to 6.5
Density—0.088 lbs/in$^3$
Modulus of Elasticity—5.2–6.1×10$^6$
Modules of Elasticity in Shear—2.3–2.8×10$^6$
Poissons Constant—0.18
Tensile Strength—2,900 PSI
Compressive Strength—14,500 PSI
Bending Strength—5,075 PSI
Shear Strength—2,900 PSI
Elongation at Rupture—0.10%
Modulus of Resilience—45.67 in-lb./in.$^2$
Thermal Conductivity—0.479–1.12 BTU/HR.Ft. °F.
Coefficient of Linear Thermal Expansion—7.7–9.4×10$^{-6}$/°F.
Specific Heat—Cp=0.2985 BTU/lbm - °F.

A suspension system is utilized to substantially isolate the base 14 from the external shocks and vibrations that are not fully damped by the housing 12. Preferably, the base also is comprised of "Granitan" or similar material. In the embodiment illustrated, the suspension system includes airfilled rubber isolators 22 (typical) developed by Firestone mounted respectively in recesses near each corner of the housing 12 for supporting the base. The isolators 22 are air filled rubber mounds and air cushions individually controlled to maintain the base 14 in a level orientation.

Figure 2:
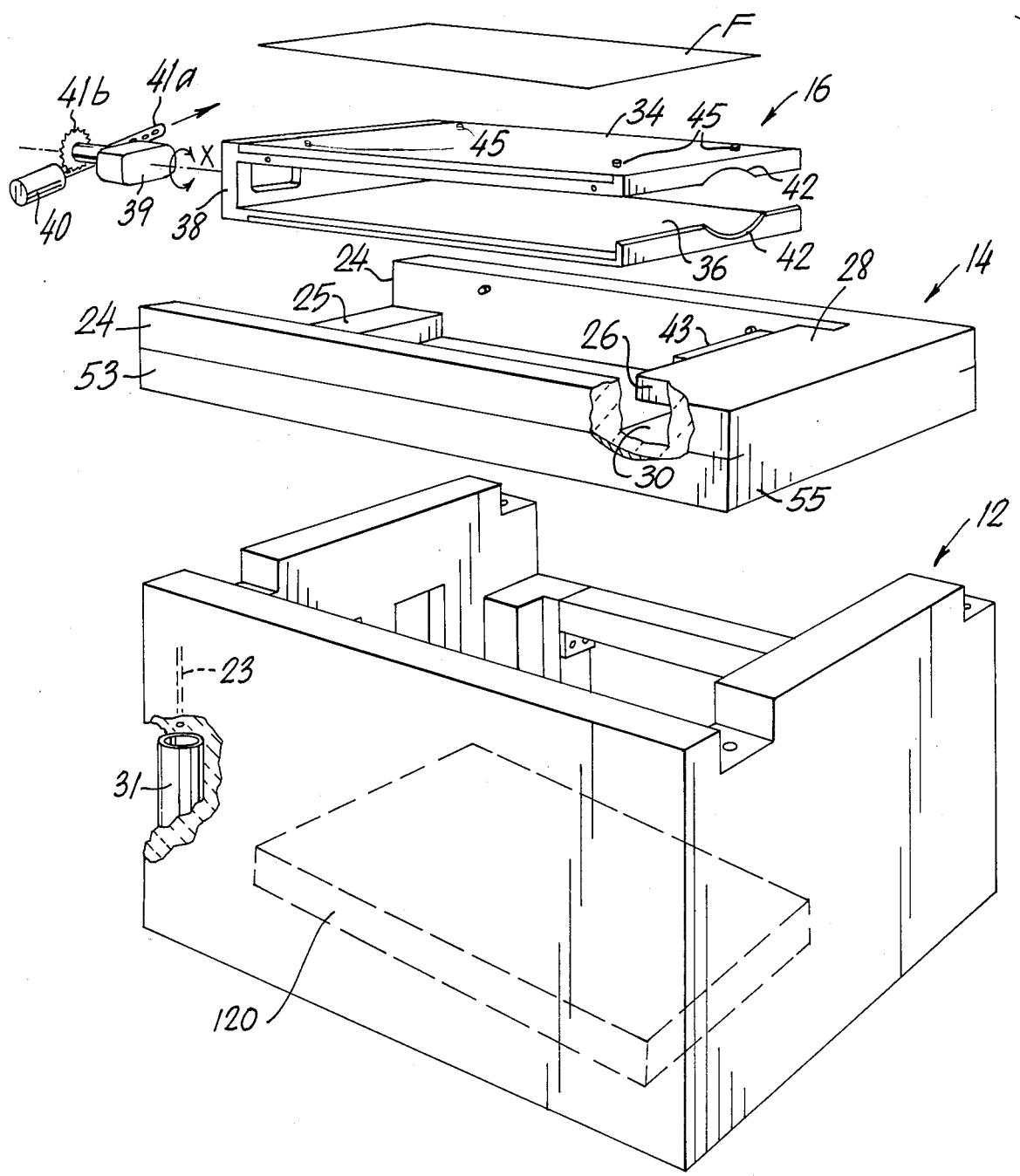
FIG. 2 is an exploded view of the optical scanning system showing the housing, level base, platen assembly, and a sheet of film.
Figure 3:
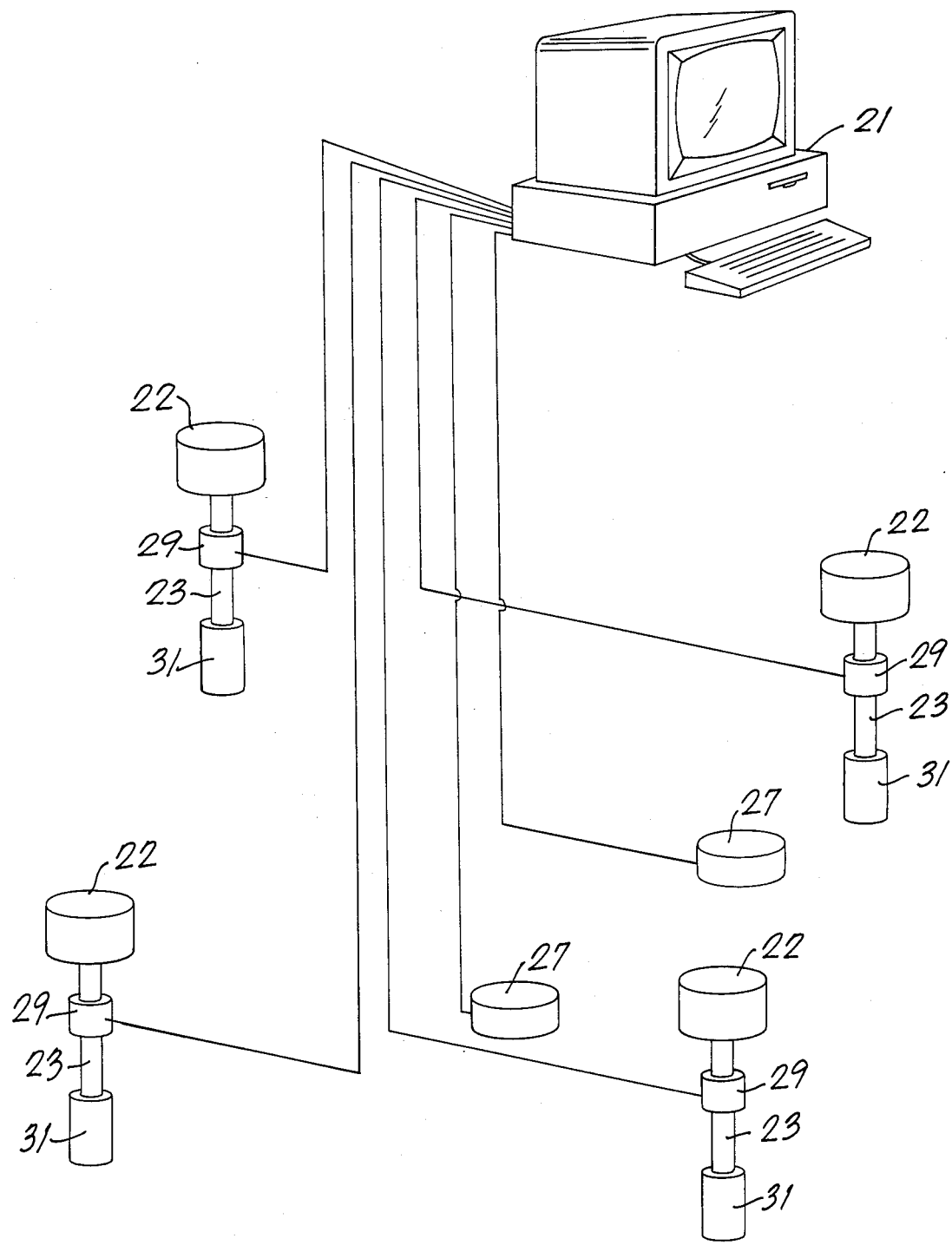
FIG. 3 is a schematic diagram of the leveling system.

Referring to FIGS. 2 and 3 the housing includes a tube 31 constructed of plastic (e.g. polyvinylchloride) for compressed air storage and embedded air lines 23 near each corner to supply air to the isolators 22. (It will be understood that the air lines are routed from the compressed air source to each of the isolators, and that the air routing may be molded or embedded internally in the walls of the housing. For simplicity, the air routing system is not illustrated in the drawing.) Referring to FIG. 3, two conventional leveling sensors 27, such as the "Clinometer" made by Sperry, sense levelness of the base 14. One sensor detects changes in pitch and the other changes in roll. They develop electrical leveling control signals which are fed to the computer 21 which in turn outputs signals to proportioning valves 29 which either admit or deplete air into or from isolators 22 to adjust the pitch and roll of the base.

At this point, it should be appreciated that the active parts of the scanner components are affixed to or otherwise associated with the base which is substantially isolated from external sources of vibration. This isolation is attained by the use of vibration damping materials in the housing and base and by the use of pneumatic isolators between the housing and base elements.

Returning to FIG. 2, the level base 14 forms a frame around the dual platen assembly 16 having two longitudinal rails 24 providing guiding support surfaces along which the gantry assembly 18 rides. A crossbar 25 is recessed below the top surface of the rails 24 at one end of the frame to accommodate the interferometer assembly 20. At the other end, the base 14 is molded to provide a lower crossarm 30, and an upper crossarm 26 forming a continuous upper surface 28 with the supporting surface of the rails 24.

As illustrated, the dual platen assembly 16 is positioned within the frame formed by the rails 24 and crossbar and crossarms 26, 30 of the base, so that the platen assembly 16 may rotate about a longitudinal axis "x". It comprises two spaced apart parallel platens 34, 36 supported at one end by a frame 38. At their other ends and along the sides, the platens are not connected so as to allow a photodetector (shown in FIG. 6) to pass between the platen faces.

At the connecting end of the frame 38, the dual platen assembly is journaled for rotation in the base by a rotatable shaft 39, defining the rotational axis. The shaft 39 in turn is rotated by a rack and gear actuator comprised of a doubleaction air cylinder 40 connected to a slide motion, gear rack 41a, and mating gear 41b for rotating the platen assembly 16 180° between two positions. In one position the metal platen 4 is positioned on top; in the second position the transparent glass platen 36 is on top.

Figure 6:
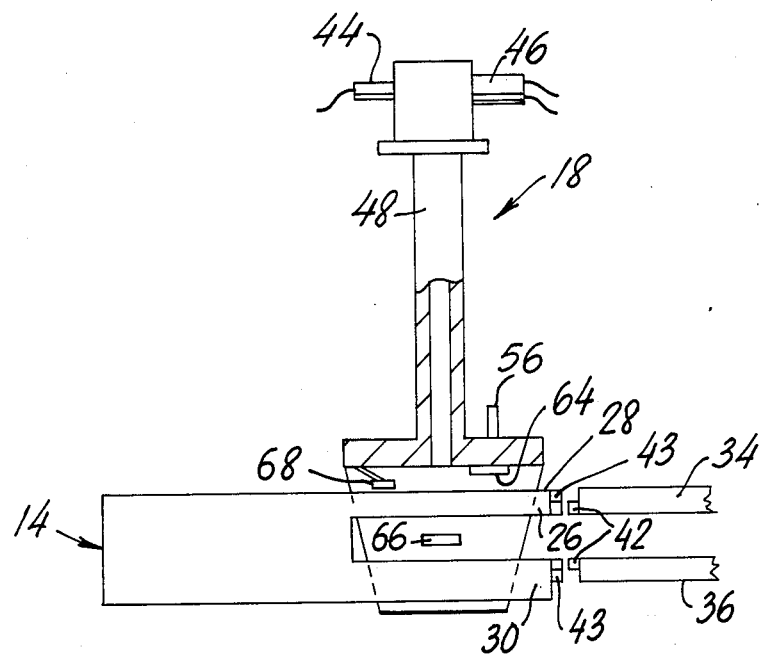
FIG. 6 is a partial cutaway view of the level base and gantry assembly in the home position between scans.

As best seen in FIGS. 2 and 6, at the open end of the dual platen assembly 16, the frame 38 is journaled for rotation in the base by a special split bearing 42. This split bearing 42, which may be either fastened to the frame or formed integrally therewith, is rotatable within a complementary split track 43 (FIG. 6)in the base. As shown, the split bearing 42 is formed with one arc segment on each of the frame's platen-supporting members. The split track 43 has one complementary track segment formed in the crossarm 26 and another complementary track segment formed in crossarm 30.

In one embodiment, the platen 34 is a conventional metal vacuum platen while the other platen 36 is a transparent vacuum platen made of glass or other material suitably transmissive to the scanning beam energy. It will be understood that the types of platens and the materials used may vary in accordance with specific applications. Retractable posts 45 protruding from the outward face of the platen 34 operate to punch reference holes in film. The glass vacuum platen 36 has a groove tracing a rectangular perimeter on its outer face and dimensioned to define an area slightly less than that of a sheet of film to be mounted on the platen. The vacuum force is applied through the groove to hold the film to the platen.

From the above description of the preferred platen assembly, it is apparent that its position is fixed during scanning. Unlike the prior commercial facsimile systems earlier noted, the platen does not need to travel in the horizontal plane to expose the complete scanning area to the scanning beam. Instead, as discussed below, the invention makes use of a scanner which moves from one end of the scanning area to the other as the scanning beam executes repetitive transverse scans. This avoids the need to move excessively massive components during scanning, and permits the entire unit to be far more compact and less space-consuming than moving platen scanners.

Figure 4:
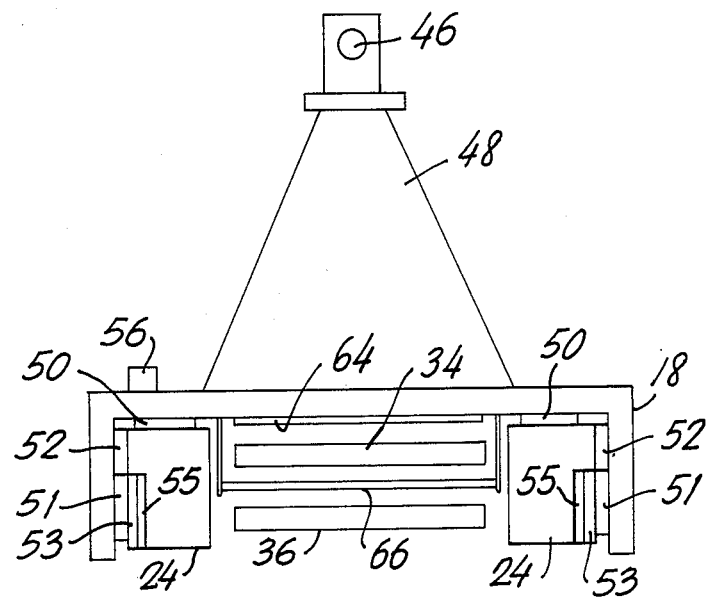
FIG. 4 is a cut-away end view of the scanning gantry assembly, showing its position relative to the support rails and platens.

Referring to FIGS. 1 and 4, the gantry assembly 18 includes a vertical mount 48 carrying a scanner comprised of a coherent light source 44 and a beam deflector 46. Preferably, the light source 44 is of the laser diode type such as used in conventional scanners represented by the "94 Pica Ultrasetter" manufactured and sold by Ultre of New York.

Figure 7:
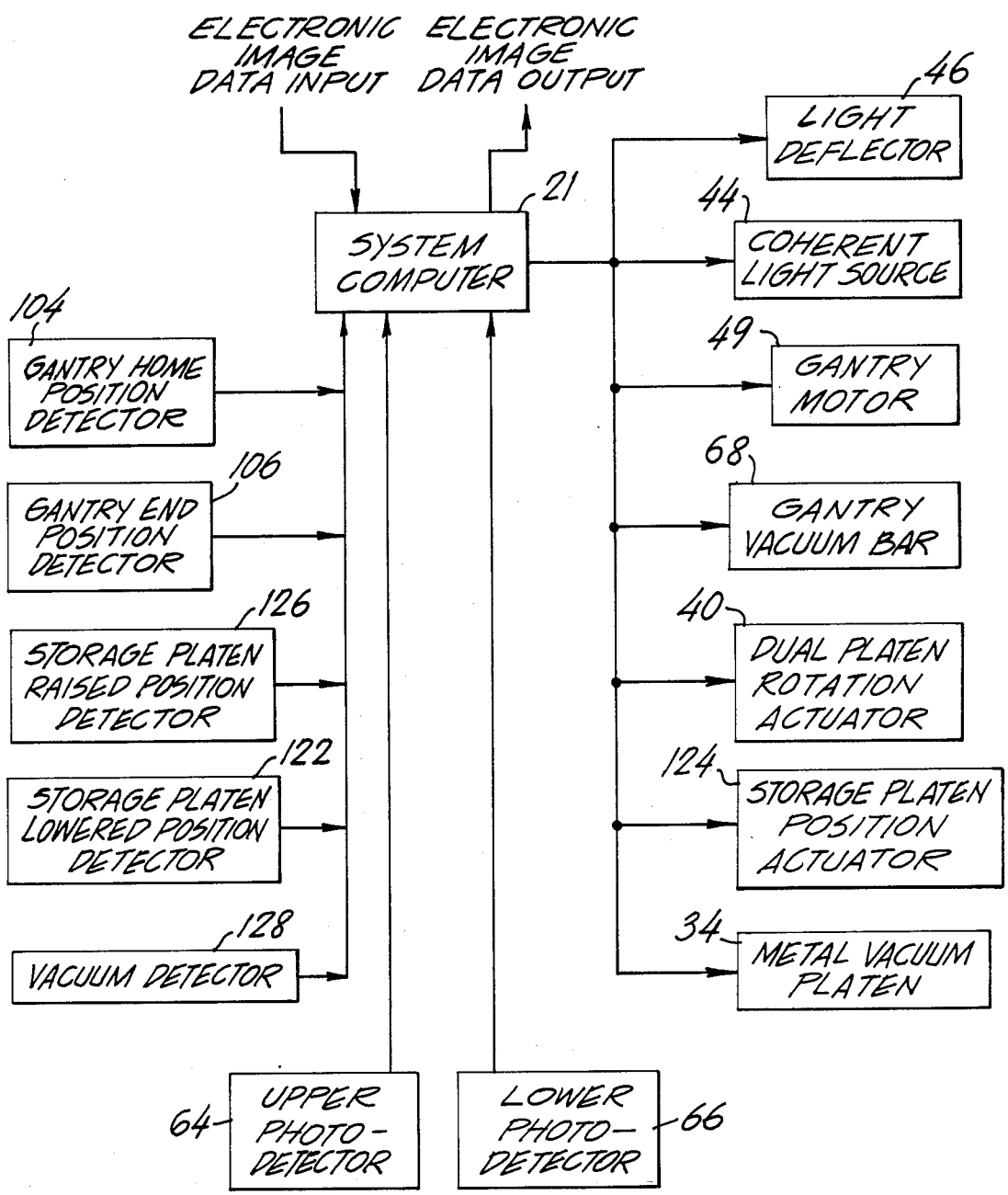
FIG. 7 is a system block diagram of the electronic interfaces to the digital controller for the optical scanning system.

A controlled linear induction motor 49 (FIG. 7) advances the gantry assembly 18 along rails 24 at a constant speed during scanning operations. As best seen in FIG. 4, the gantry assembly 18 includes coils 51 of the motor 49 positioned adjacent to a stationary aluminum strip 53 (see FIG. 2) applied to the sides of the base and spaced from the strip by a small air gap. Beneath the aluminum strips 53 are iron strips 55. In response to a command from computer 21, the coils are energized by a suitable electric power source (not shown) inducing a current between the coils 51 and the iron strips 55 in the aluminum strips 53, thereby causing a thrust force which moves the gantry assembly over the rails 24. To minimize the interaction of forces between the gantry assembly 18 and the rails, the gantry assembly includes air bearings 50, 52 dimensioned to establish a low friction interface for sliding movement over the rails.

Referring again to FIG. 1, the interferometer assembly 20 functions to regulate the gantry's linear speed. It employs a conventional interferometer 54 which emits light that is directed to a mirror 56 on the gantry assembly 18, and reflected back to the interferometer 54.

Based upon the Doppler effect the phase of the reflected light will be shifted by the linear speed of the gantry 18 to create a phase shift between the reflected light beam and a reference light beam. The reflected beam is mixed with the reference beam to produce a beat frequency which typically falls in the audio range. An audio amplifier (not shown) detects the beats and amplifies the signal. The beat frequency is then compared in a conventional frequency comparator (not shown) with a reference frequency. The frequency difference characterizes the departure of the gantry speed from a desired constant speed and develops an error signal. The error signal is fed back into the linear motor 49 to adjust the speed of the gantry assembly 18.

Figure 5:
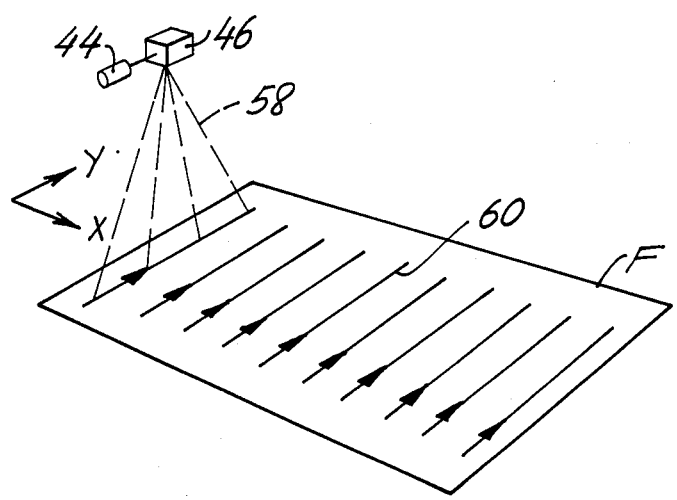
FIG. 5 is a pretrial representation support of the scanning path across a film, paste-up or transparency.

As the gantry assembly 18 moves along the rails in an x direction, the light 58 emitted from source 44 is deflected in a y direction by deflector 46 as shown. The resulting raster pattern is pictorially shown in FIG. 5, it being understood that in practice each scan line 60 of the raster is substantially contiguous but spaced longitudinally along the scanning area. Thus, the beam traverses the scanning area, is blanked during the return trace, and then executes the next scan in the y direction. The scanning pattern illustrated is thus a single line raster scanner, although an array, interlace, incremental or other scanning schemes may also be used.

Turning again to FIG. 4, the gantry assembly carries two conventional photodetectors 64, 66, such as the strip-detectors produced by the Advanced Detector Co. of City of Industry, California. The photodetector 64 positioned above the dual platen assembly 16, detects light reflected from an image on reflective backgrounds. The photodetector 66, on the other hand, is positioned between the platens to receive light transmitted through a transparency and the glass platen 36. In one embodiment, through control of the computer system 21, the photodetector output signals are sampled at a programmable rate of 500–2400 samples per inch, thus resulting in discrete electrical pulses whose intensity is related to the optical density of the scanned image at a particular point or "pixel" on the scanning area. The sampling rate, of course, may be varied to suit the capacity of electronics and the degree of horizontal resolution required. It is also apparent that various types of scanning elements may be used. For example, while laser light, being highly coherent, is preferred, infrared and visible light frequencies may also be suitable in certain instances, again depending upon resolution requirements and the nature of the materials being scanned.

Prior to scanning an image or reproducing the image on film, the gantry assembly 18 is positioned at a home position between the crossarms 26, 30 of the base 14 as shown in FIG. 6. As the gantry assembly 18 travels along the rails 24 into the home position, the photodetector 66 moves between the faces of the dual platens, through the open end of the platen assembly and between the crossarms 26, 30 of the base. Because the platen assembly frame 38 is open at the sides, the photodetector 66 can be mounted upon a support arm not shown) extending from the sides of the gantry into the inter-platen space.

The gantry assembly 18 also includes a vacuum bar 68 which may be lowered to the platen assembly 16, upon computer command. The vacuum bar holds a sheet of film and pushes the film off the platen as the gantry returns to the home position and thereby unloads the sheet of film. The system computer 21 is a conventional computer which in one embodiment is the IBM personal computer. The electronic interfaces of the system computer are shown in block diagram format in FIG. 7. The interfaces are described below.

OPERATION

Figure 8:
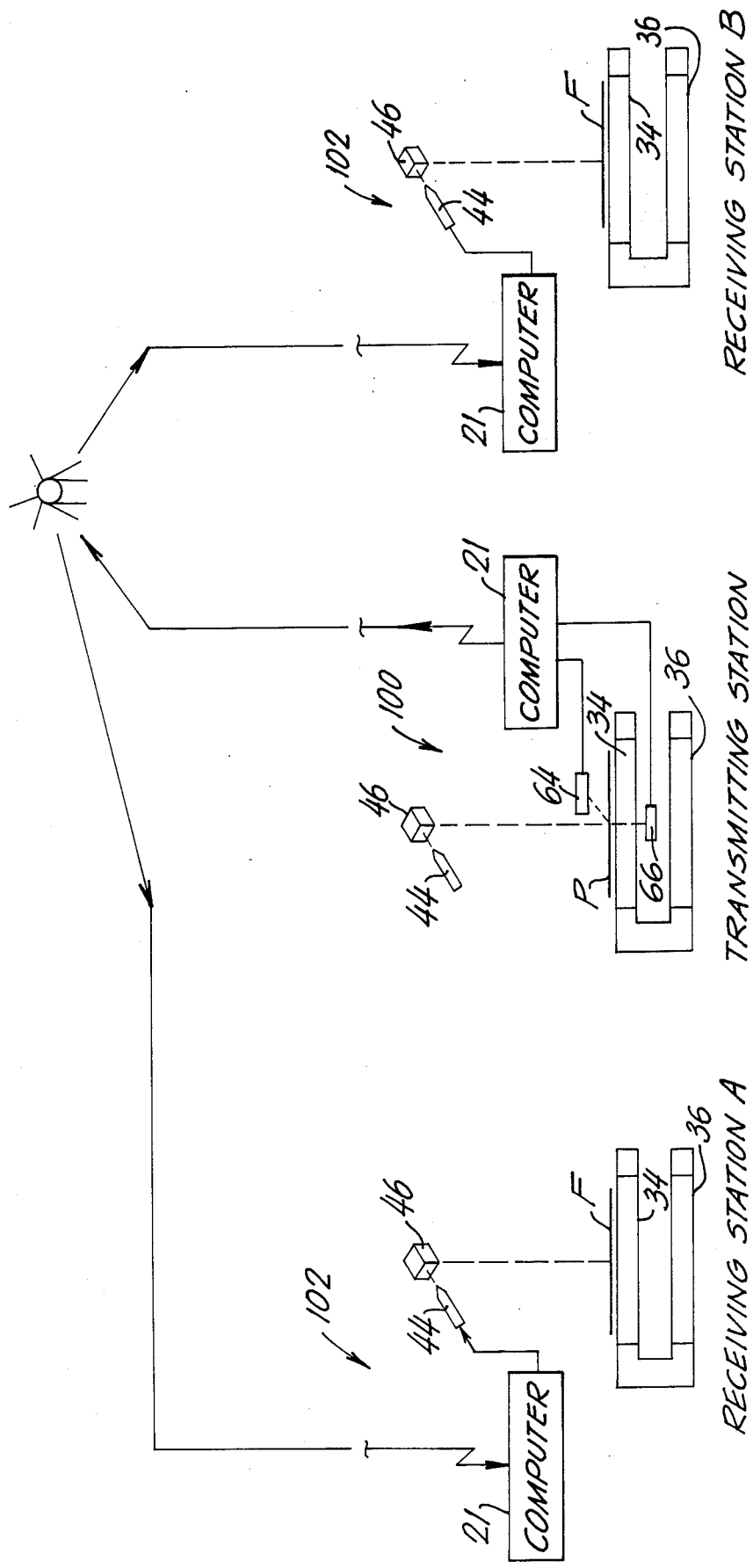
FIG. 8 is a system diagram of the operation of the optical scanning system as a scanner for transmitting an electronic image and an imager for receiving the electronic image and constituting the image on a sheet of film.

Typically, the optical scanning system 10 will be interfaced with other optical scanning systems to form a network (FIG. 8) having a central transmitting station 100 and a number of remote receiving stations 102. The transmitting station, as already noted, typically scans either an opaque paste-up or a transparent film and electronic image signals may be received from either one of the photodetectors. The system computer 21 may store the signals, combine the signals with other data, and/or transmit the images as digital signals to the remote receiving stations 102.

At the remote receiving stations 102, the system computer 21 receives and outputs the electronic signals to modulate the laser beam 'on' and 'off' as the laser beam scans a sheet of film for other photosensitive material to reproduce the image. FIG. 9 shows the sequences which are executed under computer control to scan an image.

First, the pre-scanning sequence is executed, followed by the scanning sequence, and then the post-scanning sequence.

During the pre-scanning sequence, the computer detects when the gantry assembly 18 is positioned at the home position by monitoring a position detector 104.

For scanning a paste-up, either the glass or the metal vacuum platen is the top platen. The original sheet is manually placed on the platen so that holes at the periphery of the sheet are aligned with posts on the platen. By operator command to the computer 21, a vacuum is induced at the platen and the sheet is held against the platen by a suction force.

The operator then enters a command to begin scanning. The computer 21 begins the image scanning sequence and outputs a command to the gantry's linear induction drive motor 49 and the gantry assembly moves at constant velocity along the rails 24 as the laser beam executes repetitive transverse scans across the platen. Constant linear velocity of the gantry is under control of the interferometer assembly 20.

As earlier pointed out, the upper photodetector 64 senses the modulated beam reflected from the sheet being scanned and provides a continuous analog signal. The analog signal is sampled at a fixed periodic rate and digitally converted to provide a stream of digital pulses which can be processed digitally by the computer 21 and stored either for reimaging or for transmission to remote receiving stations.

The stream of data stored comprises a "raster image" and is a binary representation of the optical image. The "raster image" is transmitted to remote receiving stations and outputted, processed and converted into a suitable analog signal for modulating the scanning laser "on" and "off" to expose portions of film as the film is scanned. In other embodiments, continuous tone imaging may be used in which the intensity of the laser beam can be varied over a continuous range. To achieve a tone imaging capability, the current supplied to the diode is varied to modulate the beam intensity and the reading of the photodetector signal would discriminate a range of intensity, not simply the presence or absence of light.

Once the gantry assembly 18 has moved along the rails and reaches the end position, a capacitance position sensor 106 senses the gantry's arrival. This is recognized by the computer 21, which then initiates the post-scanning sequence.

The computer outputs a signal to the linear motor 49 of the gantry assembly 18, causing the motor to move the gantry back along the rails 24 to the home position. A capacitance position sensor 104 detects the presence of the gantry in the home position. This event is signaled to the system computer 21, which directs control signals to system components (not shown) which triggers the release of the vacuum on the metal platen 34. The operator then removes the scanned paste-up and is ready to load the next paste-up.

For scanning transparencies, the operator inputs a command to the computer 21 to cause the dual platen rotation actuator (i e. air cylinder 40) to rotate the dual platen assembly 16 so the glass platen 36 is in the top position. The transparency is placed on the platen and aligned so that holes at the periphery of the transparency are aligned with posts on the platen. The alternate photodetector 66, positioned under the transparency, between the two platens 34, 36 detects the modulated beam transmitted through the transparency and the glass platen 36, and develops analog signals representing the information in each scanning line. Under control of computer 21, the analog signals are converted into digital format, and stored for reimaging or for transmission to a remote receiving station 102.

FIG. 9 shows the sequences executed for imaging (recording) a film. First, the film loading sequence is executed, followed by the film imaging sequence, and then the post-imaging sequence.

While one sheet of film is being imaged, the next sheet is placed onto a temporary storage platen 120 by any of a number of automatic film transport mechanisms. During the film loading sequence the computer 21 detects that the gantry assembly 18 is in the home position by a signal from the position sensor 104 and that the storage platen 120 is in the lower position by a signal from a position detector 122 (see FIG. 6). The computer 21 then outputs a signal to the air cylinder 40 to rotate the dual platen assembly 16 so that the metal vacuum platen 34 is the lower platen. A command is then issued to the storage platen position actuator 124 to raise the storage platen 120 and to bring the film flush with the metal platen 34. The computer 21 senses that the storage platen 120 is in the raised position with a position sensor 126, such as a conventional Hall effect sensor, then triggers the metal vacuum platen 34 to exert a suction force on the film and hold the film in place against platen 34.

Once the suction force is detected by a sensor 128, the computer triggers actuator 124 to lower the storage platen 120, leaving the film held to the metal platen. The computer 21 then senses the storage platen 120 in the lowered position through position detector 122. The computer 21 then signals air cylinder 40 to rotate the dual platens to place the metal platen 34 in the top position.

The film imaging sequence is now started. The computer signals the linear induction motor 49 to move the gantry assembly 18 along the rails 24 as the laser scans the film in a direction perpendicular to the movement of the gantry assembly 18. As the laser scans the film the beam is turned 'on' and 'off' in accordance with the pulses representing the minute graphic elements of the electronic image these pulses modulate the beam to identify where the film is and is not to be exposed. As described for scanning an image, alternatively, the laser intensity may be modulated for tone imaging. Tone imaging produces tones of intermediate intensity between opaque (black) and transparent (white).

Once the gantry assembly 18 has moved down the rails 24 of the level base 14 and completed its scan, the position sensor 106 indicates the end of the scan. The computer 21 monitors the signal and outputs a command to lower the vacuum bar 68 to contact the film and induce a vacuum to hold the film as part of the post-imaging sequence. The computer also sends a command to the metal vacuum platen 34 to release the vacuum which holds the film to the platen. The computer 21 then signals the motor 49 to move the gantry assembly 18 to the home position As the gantry 18 moves back along the rails 24, it pushes the film off the metal platen 34 into an automatic feeder device (not shown). The automatic feeder pulls the film, turns the vacuum off the vacuum bar 68 and typically transfers the film to a film processor (not shown) for developing the film.

Once the gantry 18 has returned to the home position, the position detector 104 signals the return. The film loading sequence then begins for another cycle. The cycle will continue until the transmission and reception of electronic images is complete.

While a preferred embodiment of this invention has been illustrated and described, the invention is capable of modification and addition without departing from its basic principles. For example, where air activators are shown, mechanical and electrical activators may be substituted. The particular electrical sensors and detectors may be chosen according to particular needs and requirements and, as described, signals may be processed in either analog or digital form. Moreover, to simplify discussion and for purposes of clarity, conventional interface elements generally used between the computer and powered physical elements have not been illustrated. Such elements, because they may take a number of forms and do not per se constitute part of the invention, may be selected according to preference of the user. As another example, while air bearings offer clear advantages in conjunction with the moving scanner gantry, other types of bearings can be substituted particularly where less accuracy and precision is tolerable. Moreover, in connection with the dual platen assembly, the base frame and platen frame may be alternately constructed and take on different shapes and forms.

The foregoing modifications are given by way of example and not limitations, it being understood that the invention is not intended to be limited to the preferred embodiment described. Accordingly, the scope of this invention is intended to be determined by the appended claims and their equivalents in light of the prior art.

I claim:

1. An optical scanning system comprising:
a base having at least one support surface;
a platen assembly mounted on said base and having two platens, each platen having an image area, the platen assembly being movable between first and second positions to selectively locate one of said platens in an orientation for scanning the image area of said one platen;
a scanner providing a coherent scanning beam tracing scan lines in a first direction across the image area of said one platen; and
means for transporting the scanner relative to the base to cause the scanning beam to move in a second direction across the image area of said one platen to trace a series of mutually displaced scan lines thereon.

2. The system of claim 1 further comprising:
means for substantially isolating the base from external vibrations.

3. The system of claim 1 further comprising:
a scanning beam detector;
wherein said one platen is transparent to the scanning beam and the scanning beam detector senses the scanning beam transmitted through said one platen, the scanning beam detector moving under said one platen with the means for transporting the scanner.

4. The system of claim 1 further comprising:
a scanning detector positioned to sense scanning beam energy reflected from the image area of said one platen, said reflected scanning beam detector being movable with the scanner.

5. The system of claim 1 further comprising:
means for monitoring the movement of the scanner and for controlling the means for transporting the scanner so as to maintain the movement of the scanner at a substantially constant velocity.

6. The system of claim 1 further comprising:
a housing supporting the base via said at least one support surface and constructed of a material effective to attenuate external vibrations received thereby.

7. The system of claim 1 wherein:
said two platens are spaced apart and generally parallel, the system further comprising:
means for rotating the platen assembly between the first position, where a first one of said two platens is said one platen, and the second position, where a second one of said two platens is said one platen.

8. The system of claim 7 further comprising:
a split bearing defining an axis of rotation of said platen assembly; and
a scanning beam detector positioned in the space between said two platens and movable with the scanner, said scanning beam detector movable through said split bearing to avoid interference with the rotation of said platen assembly.

9. An optical scanning system comprising:
a housing having an internal chamber and an opening into said chamber;
a base mounted on the housing adjacent the opening, the base having at least one support surface;
a platen mounted on said base and rotatable about an axis between a first position for being scanned and a second position for being loaded;
a scanner providing a coherent scanning beam tracing scan lines in first direction across an image area of the platen; and
means for transporting the scanner relative to the base to cause the beam to move in a second direction across the image area whereby the scanning beam traces a series of mutually displaced scan lines thereacross.

10. The system of claim 9 further comprising:
a suspension system for supporting the base on the housing via said at least one support surface so as to substantially isolate the base from vibrations in the housing.

11. The system of claim 9 further comprising:
a scanning beam detector positioned over the platen for sensing a reflected scanning beam, wherein the scanning beam detector moves with the scanner above the level of the platen.

12. The system of claim 9 further comprising:
means for monitoring the movement of the scanner and for controlling the means for transporting the scanner so as to maintain the movement of the scanner at a substantially constant velocity.

13. The system of claim 9 wherein the platen is a first platen and further comprising:
a second platen, the two platens being spaced apart and generally parallel; and
means for rotating the two platens about said axis between a first position where the first platen is scanned and a second position where the second platen is scanned.

14. The system of claim 13 further comprising:
a scanning beam detector;
wherein one of the platens is transparent to the scanning beam and wherein the scanning beam detector is positioned under said one platen for sensing the scanning beam transmitted through said one platen, and
wherein the scanning beam detector moves under the platen with the means for transporting the scanner.

15. A method for loading a sheet into a scanning system having a vacuum platen and a scanner, the platen having a first face for holding a sheet to be imaged and being rotatable between a first position for loading the sheet onto the first face and a second position for imaging the sheet, the scanner being movable out of the platen's path of rotation, comprising the steps of:
   moving automatically the scanner out of the platen's path of rotation;
   raising automatically a sheet to the first face of the vacuum platen and holding the sheet to the first face of the platen with a vacuum force while the platen is in the first position; and
   rotating automatically the platen to bring the sheet to the second position.

* * * * *